United States Patent [19]

Halopoff

[11] 4,057,235

[45] Nov. 8, 1977

[54] SPRING RETAINER FOR GARAGE DOOR HARDWARE

[76] Inventor: William Halopoff, 17720 Crusader St., Cerritos, Calif. 90701

[21] Appl. No.: 692,288

[22] Filed: June 3, 1976

[51] Int. Cl.² ............................................. F16F 1/12
[52] U.S. Cl. ..................................................... 267/73
[58] Field of Search ................................... 267/69–74, 267/168, 169; 16/72; 49/200, 203, 206; 160/190, 191, 192

[56] References Cited

U.S. PATENT DOCUMENTS

| | | | |
|---|---|---|---|
| 1,286,664 | 12/1918 | Larson | 16/72 UX |
| 2,120,528 | 6/1938 | Purweet | 267/72 |
| 2,657,420 | 11/1953 | Carbary | 267/74 X |
| 2,665,903 | 1/1954 | Green | 267/73 |
| 3,429,072 | 2/1969 | Sammons | 267/74 X |
| 3,575,404 | 4/1971 | Wesch | 267/74 |

Primary Examiner—Johnny D. Cherry

[57] ABSTRACT

A retainer to restrain pieces of a coil spring from scattering when the spring breaks under tension makes use of two mutually slidable elements located within the interior of the coil spring. Adjacent ends of the elements have a sliding engagement with each other and include a yieldable cushion inherent in the structure to absorb the impact when the spring breaks. The respective opposite ends of the elements are attached, one to the spring keeper at one end of the spring and the other to the spring keeper at the opposite end of the spring.

5 Claims, 11 Drawing Figures

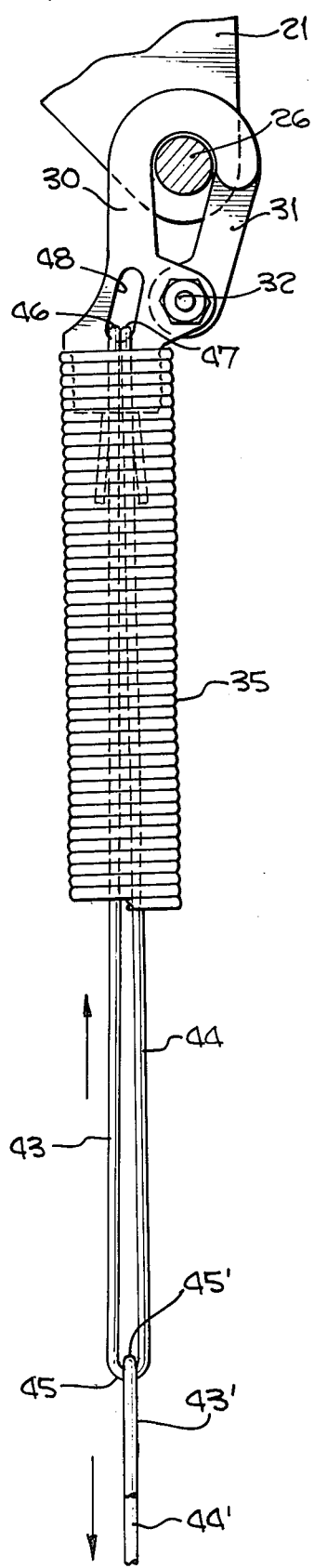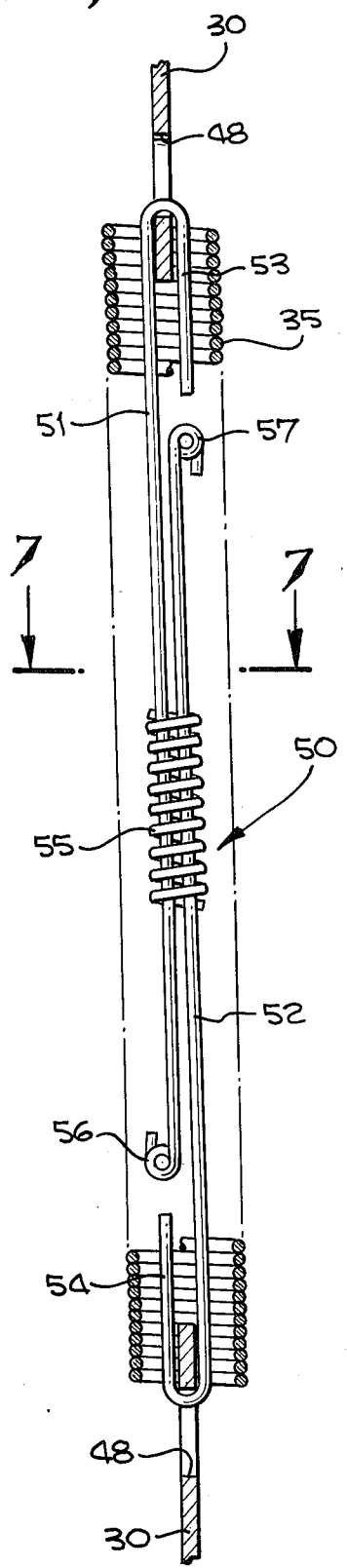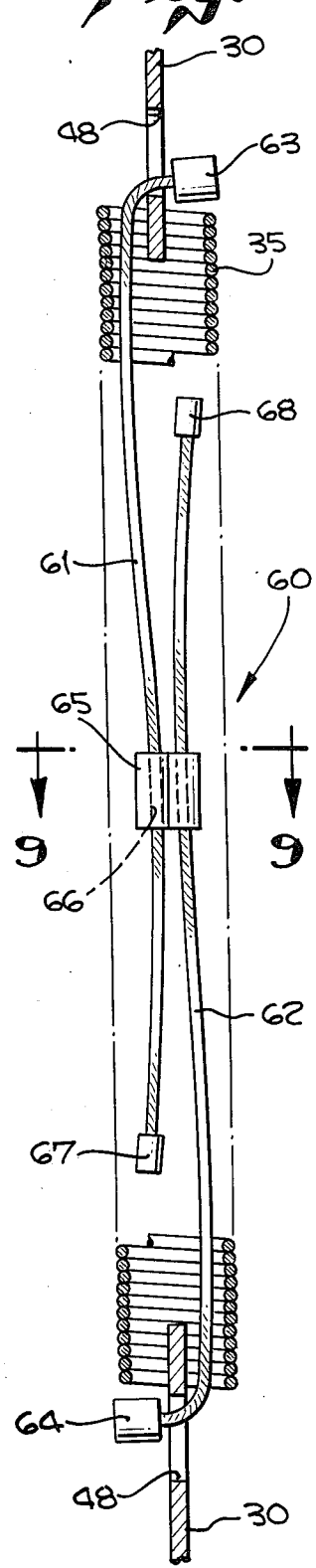

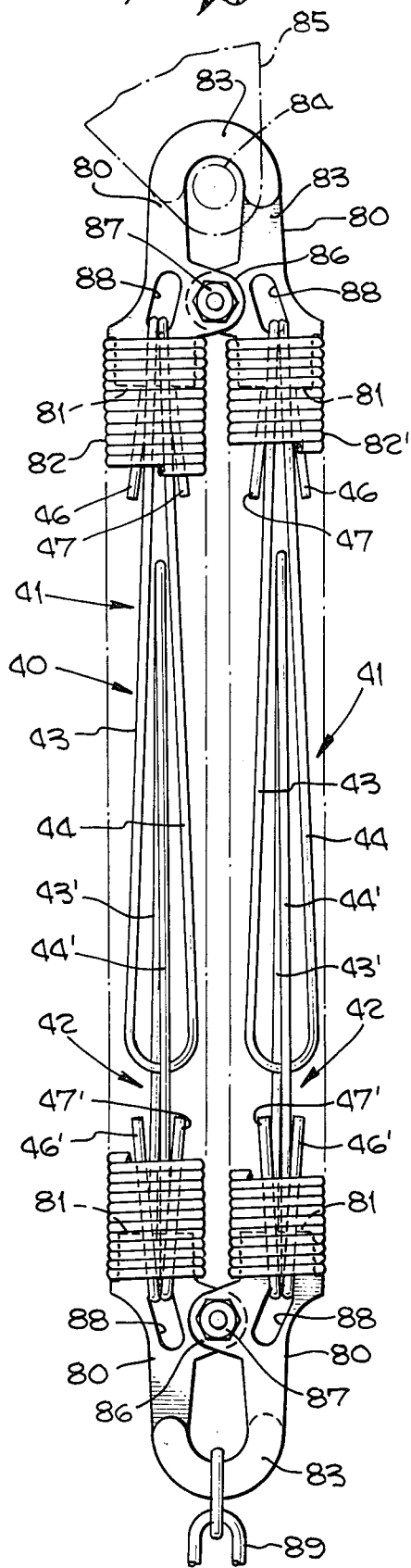
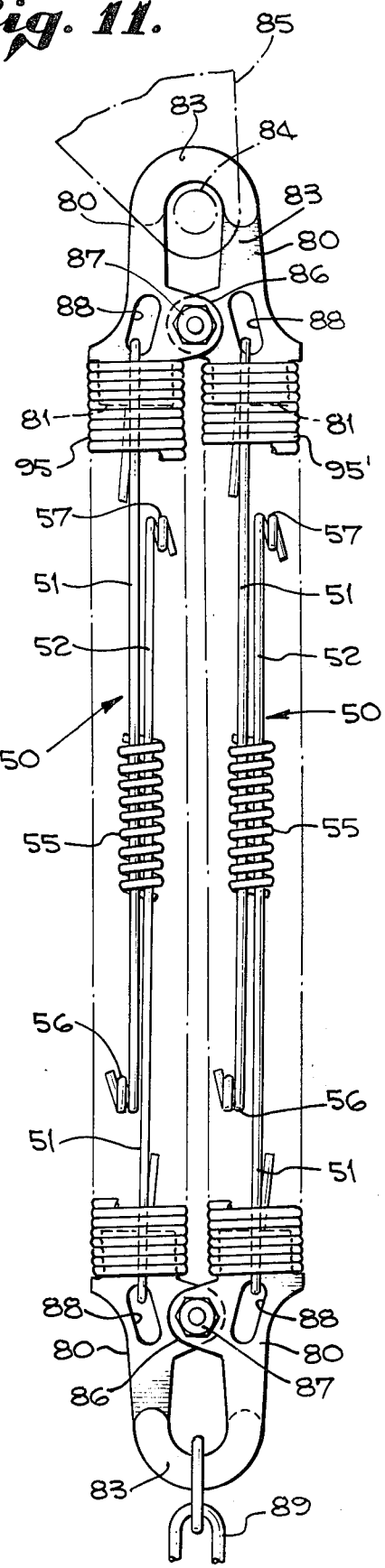
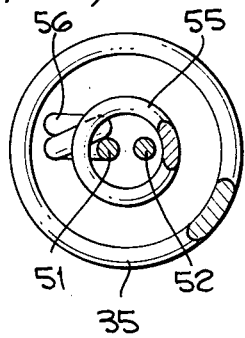
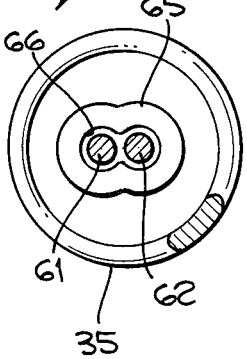

SPRING RETAINER FOR GARAGE DOOR HARDWARE

One of the contingencies that regularly faces users of counterbalance tension springs to assist in the closing of garage doors is the prospect of rupture of the spring under tension. No matter how well springs of this kind may be constructed after constant use for 2 or 3 years the metal of the spring progressively fatigues and there is always prospect of the spring rupturing under tension, because this rupture takes place when the spring is stretched with a great deal of energy built up into it. Under such circumstances broken pieces of the spring tend to tear loose from the brackets to which they are attached and are apt to cause damage either to the premises or an automobile which may be parked adjacent. Even though the fragmented ends of the springs may be securely attached to the bracket on either the door or the building structure there is still prospect of the free end of the spring popping out and either impinging against the surrounding structure or, should a person chance to be standing near the tensioned spring at that particular moment, bruise or maim the individual.

In recognition of this hazard various precautionary code sections have been promulgated requiring safety restraining devices of sundry kinds to prevent the damage and hazards which have been referred to. It has however been recognized as the result of careful tests that the stored energy in a highly tension spring is so great that many restraining devices meeting legal requirements still fall short of a desired degree of safety.

It is therefore among the objects of the invention to provide a new and improved restrainer for counterbalance tension springs which is sufficiently thorough in its capability to restrain and confine the spring that not only are fragmented parts prohibited from being propelled dangerously around the premises but broken free ends of the spring are also held in their original position.

Another object of the invention is to provide a new and improved restrainer for counterbalance tension springs which is very simple and inexpensive in its construction and also of such character that it can be readily installed.

Still another object of the invention is to provide a new and improved restrainer for counterbalance tension springs which has an inherent built-in cushion effect so that the initial somewhat drastic reaction of the spring when breaking under tension is dampened by a gradual isolating action of elements of the restrainer so that the fragmented parts are eased into a broken retained position, in that way making a relatively lighter restrainer structure perform effectively.

Still further among the objects of the invention is to provide a new and improved restrainer for counterbalance tension springs which is capable of being entirely contained within the interior of the spring without parts protruding, which is constructed of moving parts arranged in such fashion that they readily and easily follow the alternate expanding and contraction of the spring without any hang up on the extended coils and act with sufficient promptness upon rupture of the spring so that all fragmented pieces regardless of how many are confined substantially to the position occupied by the spring when the rupture takes place.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 5 is a longitudinal elevational view of one end of the assembly of FIG. 3 as it would appear with the spring broken under tension.

FIG. 6 is a longitudinal elevational view of a second form of the device showing the spring in collapsed condition.

FIG. 7 is a cross-sectional view on the line 7 — 7 of FIG. 6.

FIG. 8 is a longitudinal sectional view of still another form of the device with the spring in collapsed condition.

FIG. 9 is a cross-sectional view on the line 9 — 9 of the FIG. 8.

FIG. 10 is a tandem spring arrangement of the device of FIGS. 3 and 4.

FIG. 11 is a tandem spring arrangement of the form of device of FIG. 6.

Figure 1:
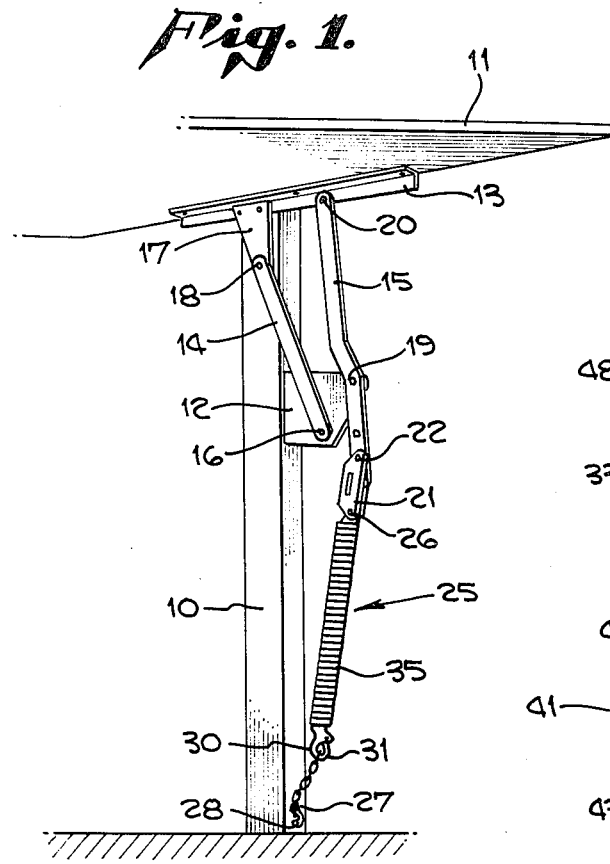
FIG. 1 is a side perspective view of a counterbalance spring installation on a garage door showing a typical arrangement of operating parts when the door is in open position.

In an embodiment of the invention chosen for the purpose of illustration, there is shown a counterbalance spring installation applied to a building structure in the form of a jamb post 10 on which is mounted an overhead garage door panel 11. A plate 12 on the jamb post 10 together with an angle strip 13 cooperate with a control lever 14 and a booster lever 15 to support the door in a position so that it can swing between the elevated open position of FIG. 1 and the lowered closed position of FIG. 2.

More particularly there is a pivot pin 16 which attaches the lower end of the control lever 14 to the plate 12. A bracket 17 anchored to the angle strip 13, has the upper end of the angle strip attached to it by means of a pivot pin 18.

In a somewhat similar fashion the lower end of the booster lever 15 is attached by means of a pivot pin 19 to another part of the plate 12 in a manner such that the booster lever acts as a first class lever. A pivot pin 20 attaches the upper end of the booster lever to the angle strip 13. At the lower end of the booster lever there is provided a kick plate assembly 21 which is hung on the booster lever by a pin 22.

A counterbalance spring assembly indicated generally by the reference character 25 has its upper end hung on the kick plate assembly by use of a bolt 26. At the lower end the counterbalance spring assembly, by way of example, is attached by means of appropriate hook members 30, 31 to a chain 27 and a lag screw 28 which is mounted on the jamb post 10. Counterbalance spring assemblies have become substantially conventional overhead garage door hardware for the past decade although mountings have been changed from time to time.

Particulars with respect to the counterbalance spring assembly have been subject to revision in the light of safety requirements to the extent that for attachment of the upper end of the counterbalance spring assembly to the kick plate assembly similar hook members 30 and 31 are pivotally connected by means of a bolt 32, one of the hook members being provided with a downwardly extending tab 33 provided with recesses 34 for reception of the upper several coils of a tension spring 35. The chain 27 previously made reference to is attached to an elongated hole 48 in another hook member 30 at the bottom where the hook members 30 and 31 are duplicated.

Figure 3:
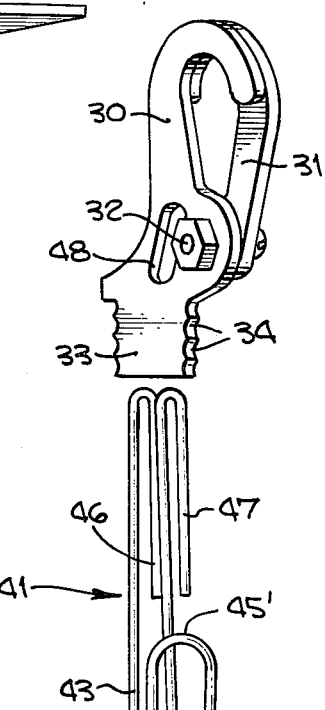
FIG. 3 is a longitudinal elevational view of the spring and retainer in assembled position.
Figure 3:
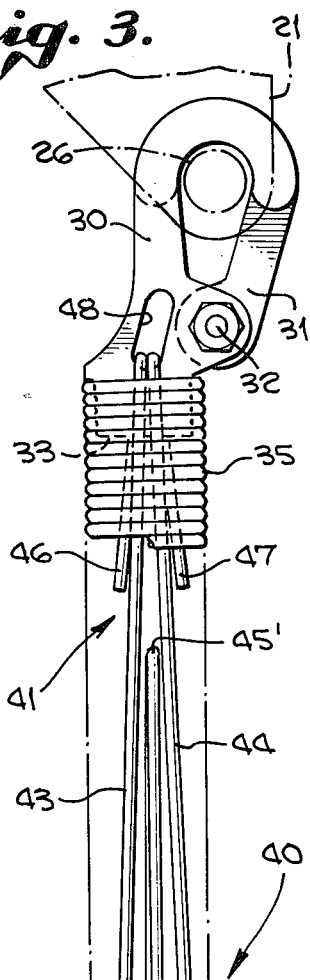
Figure 4:
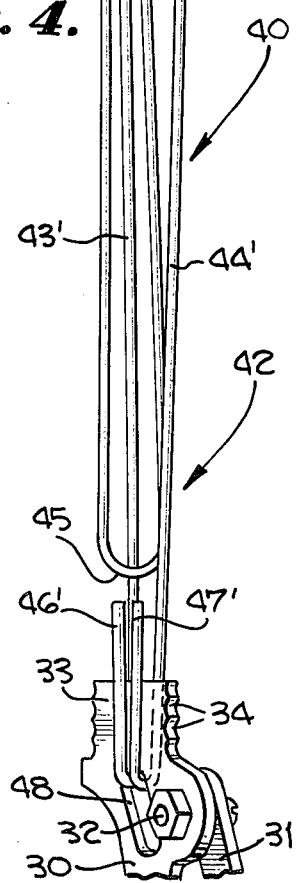
FIG. 4 is a longitudinal exploded view showing the spring retainer parts only in their position relative to the brackets.

Located within the spring 35 and extending throughout its length is a retainer assembly which has been given the reference character 40 in the form of the invention of FIGS. 3, 4, and 5. The retainer assembly consists of respective upper and lower retention members 41 and 42. The members are substantially duplicates of each other. The upper retention member consists of a single rod having parallel parts 43 and 44 which at the lower ends form a relatively wide loop 45. Bent sections 46 and 47 at the upper end extend through an elongated hole 48 in the hook member 30 to attach the retention member to the hook member.

Similarly, the retention member 42 has parallel parts 43' and 44' bent to form a similar relatively wide loop 45' which extends through the loop 45 so as to potentially interlock the retention members at their free end. Bent sections 46' and 47' at the lower end of the retention member 42 engage an elongated hole 48 in a second hook member 30.

It is of consequence to note that the loops 45 and 45' are wide relatively loose loops and slide freely one within the other from the collapsed position of the spring 35 as shown in FIGS. 3 and 4 to the extended position of FIG. 5. The retention members are made of such length between the respective loop and the bent sections so that each retention member is slightly longer than one half the extended length of the spring 35 when it is in the position occupied when the door 11 is closed as in FIG. 2.

In the operation of this form of the device it can be assumed that the spring is initially in the collapsed condition shown in FIGS. 1 and 3. In this position the retention members will be moved to positions such that the loops 45 and 45' are widely separated, as shown advantageously also in FIG. 4.

Figure 2:
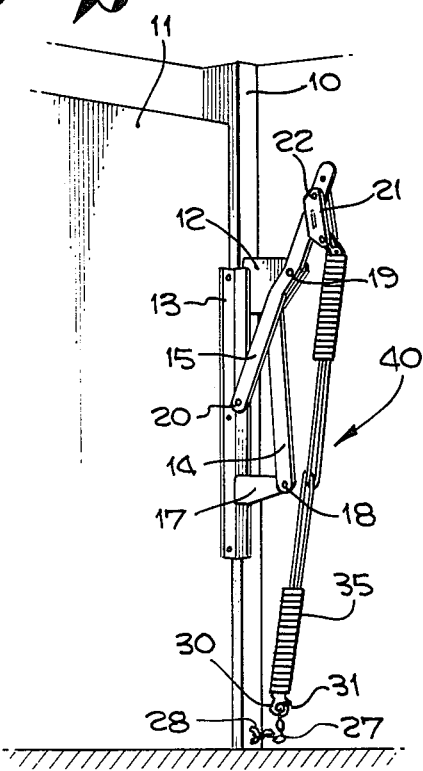
FIG. 2 is a view similar to FIG. 1 showing the position of parts when the door is in closed position and showing a part of the tension spring in severed condition.

When the garage door is closed to the position of FIG. 2 the spring 35 is stretched to its greatest length. This is usually the position the spring has at such time as it may rupture. Sometimes the spring will rupture at one point only somewhere intermediate its opposite ends. There is also the possibility that the spring may break simultaneously at two or more locations leaving one intermediate piece free.

In the event of such a rupture the ruptured spring parts separate, as suggested in FIG. 2, and on occasions may swing laterally toward one side or the other. As the result of such rupture the loops 45 and 45' are drawn into engagement to the position of FIGS. 2 and 5. By reason of the fact that the loops have initially been made rather large and loose the inherent resistance of the material of the rod at the wide loops serves as a cushion. While they are bent from the form of wide loops as shown in FIGS. 3 and 4 to collapsed loops as shown in FIG. 5, the action described cushions the blow and further serves to minimize the prospect of one or another of the rods fracturing under such a circumstance. Furthermore because the retainer assembly 40 lies entirely within the coiled spring 35 not only does it prevent any severed ruptured parts from being impelled away from the spring location but also prevents free broken ends of parts of the spring which are attached from swinging outwardly more than a relatively minimum distance.

In the form of invention of FIG. 6 a retainer assembly 50 consists of respective upper and lower retention rods 51 and 52. A bent section 53 serves to attach the retention rod 51 to the hook member 30 by extending through the hole 48. Similarly a bent section 54 of the rentention rod 52 extends through the hole 48 of the hook member 30 at the lower end. In this form of the device an expanded coil compression spring 55 serves as a cushion. Cooperating with the expanded coil compression spring 55 is a stop 56 formed by twisting the extremity of the retention rod 51 into the form of two or three tight loops. A similar stop 57 is provided for the retention rod 52. These stops are sufficiently large so that they cannot pull through the coil compression spring under circumstances where the retention rods are suddenly jerked apart as the result of rupture of the spring 35.

In the form of device of FIG. 8 parts forming a retention assembly 60 comprise respective upper and lower retention cables 61 and 62. The upper end of the upper retention cable 61 extends through the hole 48 in the hook member 30 and is provided with a stop 63 which can be a metal ferrule pinched on or welded to the end of the cable. Simiarly a stop 64 is attached to the lower end of the lower retention cable 62 where it passes through the hole 48 in the bottom hook member 30. The stops are made larger in diameter than the breadth of the respective holes 48 so that the stop cannot pull through once it has been attached.

Slidably interlocking the retention cables 61 and 62 is a block 65 which has a relatively large FIG. 8 shaped passage 66 extending through it. Once the cables have been extended slidably through the passage 66 they are equipped with respectively a stop 67 for the cable 61 and a stop 68 for the cable 62, these being stops of the same description as made reference to for the stop 63.

The lengths of the respective retention cables between their opposite ends is in the case of FIG. 8 made such that in extended position of the spring 35 the stops 67 and 68 engage or almost engage respective opposite sides of the block 65. By reason of the inherent resiliency in a flexible metal cable of the type contemplated there is in this instance also a pronounced strong cushioning effect exhibited when rupture of the spring produces a sudden jerk on the cables. As described in connection with FIGS. 3, 4, and 5, the forms of devices of FIGS. 6, 7, 8, and 9 also provide a centerably disposed retention means which not only prevents loose parts of a ruptured spring from being thrown away from the assembly but also prevents free ruptured ends of attached portions of the spring from swinging dangerously in a sidewise direction.

In a tandem embodiment of the invention illustrated in FIG. 10 hook elements 80 are similar to the hook elements 30 of the embodiment of FIGS. 3, 4, and 5. There are two hook elements 80 at each end. These hook elements are identical but arranged face-to-face in a cooperative relationship. Each of the hook elements is provided with a tab 81 for engagement with the respective spring 82, 82' and a hooked portion 83 which overlies a pin 84 in the conventional kick plate 85. There is a second tab 86 for reception of a bolt 87 by means of which the hook elements 80 are secured together in pivotal relationship face-to-face.

In each of the hook elements is an elongated hole 88 for retention of bent sections 46 and 47 of parts 43 and 44 respectively of the retention member 41 on the upper side. A similar retention member 42 on the lower side has corresponding parts 43' and 44' terminating in hooked portions 46' and 47' which engage the hole 88 of the corresponding hook element 80 on the bottom. In the other spring 82' of the tandem assembly of FIG. 10 all of the parts just described are duplicated. At the lower end the hooked portions 83 may engage a conventional chain 89 or other appropriate connector.

In FIG. 11 is another tandem arrangement which, in the alternative, is shown provided with retainer assemblies 50 on each side like those shown and described in connection with FIG. 6.

At each of the upper and lower ends of the tandem arrangement of FIG. 11 there are hook elements 80 having a structure substantially like that shown and described in FIG. 10 and in tandem arrangement as shown.

In the tandem arrangements of either of FIGS. 10 or 11 should either of the springs of the tandem assembly rupture singly the broken parts are effectively retained by the retention assembly. Furthermore should the rupture of one spring result in undue strain being placed on the remaining spring of the tandem causing it to rupture the retention assembly in that spring effectively prevents any broken pieces from being dislodged from the assembly and flung into the surrounding area.

The same effectiveness inherent in the tandem arrangement of FIG. 10 applies in the same fashion to the tandem arrangement of FIG. 11.

Having described the invention what is claimed as new in support of Letters Patent is as follows:

1. In a counterbalance spring assembly which includes a coil counterbalance spring having a bracket at each end for attachment respectively to a stationary supporting structure and to a movable panel, each said bracket comprising spring engaging means at one end, a hook member at the other end and an intermediate portion exterior with respect to the spring having a transversely extending opening therethrough, and a safety device for restraining parts of the spring in event of rupture of the counterbalance spring when under tension, said safety device comprising a pair of mutually extendable elongated composite retention elements each having a length not exceeding the length of the counterbalance spring in retracted position of the counterbalance spring, an inner section of each of the retention elements located intermediate opposite ends of the spring having a sliding engagement with the other of the retention elements, and an outer section of each retention element adjacent the corresponding end of the spring being attached to a respective one of said brackets at the intermediate portion thereof, interlocking means on the inner section of said retention elements operative when the counterbalance spring is at substantially the full extended position, said retention elements having yieldable stop means operable when the counterbalance spring ruptures under tension whereby to prevent rupture of the safety device.

2. A counterbalance spring assembly as in claim 1 wherein the retention elements each comprise a rod having both ends attached through the opening in the intermediate portion of the same bracket and back into the adjacent end of the spring, said rod including a loop intermediate the ends, the loops of said rods having a sliding interlocked relationship with each other.

3. A counterbalance spring assembly as in claim 2 wherein the loops have a radius of curvature approaching one half the inside diameter of the counterbalance spring and are adapted to yield on rupture of the counterbalance spring whereby to comprise said yieldable stop means.

4. A counterbalance spring assembly as in claim 1 wherein said yieldable stop means comprises an expanded coil compression shock absorbing spring surrounding the inner sections of both of said retention elements and stops at the extremities of said inner sections, the length of the shock absorbing spring being substantially less than the lengths of said inner sections, said stops having positions of engagement with said shock absorbing spring under a condition of rupture of said counterbalance spring.

5. A counterbalance spring assembly as in claim 1 wherein the retention elements are flexible cables having outer ends extending through the opening in the respective bracket and stops on the outer extremities of the cables, said interlocking means comprising a block having a passage means therethrough for free sliding reception of the cables and stops at inner extremities of the cables adapted to engage the block on rupture of the counterbalance spring.

* * * * *